(12) United States Patent
Chesley et al.

(10) Patent No.: US 6,579,161 B1
(45) Date of Patent: *Jun. 17, 2003

(54) ABRASIVE ARTICLE

(75) Inventors: Jason A. Chesley, Hudson, WI (US);
Donald R. Bell, White Bear Township, Ramsey County, MN (US); Harold E. Rude, Roseville, MN (US); William F. Sheffield, Oakdale, MN (US); David F. Slama, Vadnais Heights, MN (US); Alan N. Stephens, Warwickshire (GB)

(73) Assignee: 3M Innovative Properties Company, St. Paul, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/772,051

(22) Filed: Dec. 6, 1996

Related U.S. Application Data

(63) Continuation of application No. 08/181,192, filed on Jan. 13, 1994, now abandoned.

(51) Int. Cl.$^7$ ................................................ B24B 11/00
(52) U.S. Cl. ........................ 451/538; 451/359; 451/539
(58) Field of Search ...................... 451/344, 353, 451/359, 526, 533, 538, 539

(56) References Cited

U.S. PATENT DOCUMENTS

| | | | |
|---|---|---|---|
| 2,717,437 A | 9/1955 | De Mestral | 28/72 |
| 2,958,593 A | 11/1960 | Hoover et al. | 51/295 |
| 3,009,235 A | 11/1961 | De Mestral | 28/78 |
| 3,027,595 A | 4/1962 | Takai et al. | 18/10 |

(List continued on next page.)

FOREIGN PATENT DOCUMENTS

| | | | |
|---|---|---|---|
| CH | 339155 | 8/1959 | |
| DE | 32 44 410 A1 | 10/1983 | ........... A44B/18/00 |
| DE | OS 39 03 204 | 2/1990 | ........... B24D/11/02 |
| DE | 42 41 908 | 6/1993 | ........... B24D/9/08 |
| EP | 0 211 564 | 2/1987 | ........... A44B/18/00 |
| EP | 0 258 015 | 3/1988 | ........... A44B/18/00 |
| EP | 0 276 970 | 8/1988 | ........... A41B/13/02 |
| EP | 0 278 866 | 8/1988 | ........... A44B/18/00 |
| EP | 0 319 248 | 6/1989 | ........... A41B/13/02 |
| EP | 0 325 528 A1 | 7/1989 | ........... F16B/5/07 |
| EP | 0 578 865 | 1/1994 | ........... B24D/3/00 |
| FR | 1.383.501 | 11/1964 | |
| FR | 1.513.722 | 1/1968 | |
| FR | 2 101 195 | 3/1972 | ........... A44B/21/00 |
| FR | 2 364 004 | 4/1978 | ........... A44B/21/00 |
| GB | 1199940 | 7/1970 | ........... B24D/9/00 |
| GB | 1205267 | 9/1970 | ........... B24D/9/08 |
| JP | 51-151189 | 5/1975 | |
| JP | 54-72792 | 11/1977 | |
| JP | 55-93457 | 6/1980 | |

(List continued on next page.)

OTHER PUBLICATIONS 3M brochure entitled "3M™ Hookit™ Finishing Film Discs . . . "; Document No. 60–4400–5202–9 (5410)JR; 3M Automotive Trades Division, St. Paul, MN 1994.

Dominick V. Rosato, PE and Donald V. Rosato, PhD (eds), *Injection Molding Handbook*, pp. 504–506, 596, 619–621, 752–754, and 756; Van Nostrand Reinhold Company, New York, 1986.

*Primary Examiner*—Eileen P. Morgan
(74) *Attorney, Agent, or Firm*—Gregory D. Allen

(57) ABSTRACT

An abrasive sheet member is disclosed, including a substrate having first and second major surfaces, an abrasive on the first major surface, and a plurality of hooking stems on the second major surface. The hooking stems are adapted to hook engaging structures on an opposed surface to releasably affix the abrasive sheet member to the surface.

72 Claims, 3 Drawing Sheets

U.S. PATENT DOCUMENTS

| | | | |
|---|---|---|---|
| 3,138,841 A | 6/1964 | Naimer | 24/204 |
| 3,147,528 A | 9/1964 | Erb | 24/204 |
| 3,192,589 A | 7/1965 | Pearson | 24/204 |
| 3,235,438 A | 2/1966 | Wisotzky | 161/62 |
| 3,270,408 A | 9/1966 | Nealis | 29/408 |
| 3,312,583 A | 4/1967 | Rochlis | 161/62 |
| 3,320,649 A | 5/1967 | Naimer | 28/72 |
| 3,353,663 A | 11/1967 | Kayser et al. | 206/59 |
| 3,408,705 A | 11/1968 | Kayser et al. | 24/204 |
| 3,490,107 A | 1/1970 | Brumlik | 24/204 |
| 3,494,006 A | 2/1970 | Brumlik | 24/204 |
| 3,522,637 A | 8/1970 | Brumlik | 24/204 |
| 3,555,601 A | 1/1971 | Price | 18/10 |
| 3,594,863 A | 7/1971 | Erb | 18/5 |
| 3,594,865 A | 7/1971 | Erb | 18/5 |
| 3,703,739 A | 11/1972 | Young et al. | 15/230.17 |
| 3,708,833 A | 1/1973 | Ribich et al. | 24/204 |
| 3,718,725 A | 2/1973 | Hamano | 264/163 |
| 3,762,000 A | 10/1973 | Menzin et al. | 24/204 |
| 3,773,580 A | 11/1973 | Provost | 156/66 |
| 3,849,840 A | 11/1974 | Yamada et al. | 24/204 |
| 3,849,949 A | 11/1974 | Steinhauser et al. | 51/406 |
| 3,863,304 A | 2/1975 | Brumlik | 24/204 |
| 3,913,183 A | 10/1975 | Brumlik | 24/204 |
| 4,024,003 A | 5/1977 | Buhler | 156/148 |
| 4,056,593 A | 11/1977 | de Navas Albareda | 264/145 |
| 4,147,580 A | 4/1979 | Buell | 156/291 |
| 4,169,303 A | 10/1979 | Lemelson | 24/204 |
| 4,184,291 A | 1/1980 | Marton | 51/170 |
| 4,216,257 A | 8/1980 | Schams et al. | 428/93 |
| 4,263,755 A | 4/1981 | Globus | 51/358 |
| 4,287,685 A | 9/1981 | Marton | 51/170 |
| 4,290,174 A | 9/1981 | Kalleberg | 24/204 |
| 4,290,832 A | 9/1981 | Kalleberg | 156/72 |
| 4,315,885 A | 2/1982 | Lemelson | 264/297 |
| 4,322,875 A | 4/1982 | Brown et al. | 24/204 |
| 4,410,327 A | 10/1983 | Baggaley | 604/391 |
| 4,437,269 A | 3/1984 | Shaw | 51/358 |
| 4,454,183 A | 6/1984 | Wollman | 428/92 |
| 4,563,380 A | 1/1986 | Black et al. | 428/100 |
| 4,609,581 A | 9/1986 | Ott | 428/100 |
| 4,653,582 A | 3/1987 | Ehrenfried | 116/212 |
| 4,665,909 A | 5/1987 | Trainor | 128/155 |
| 4,699,622 A | 10/1987 | Toussant et al. | 604/389 |
| 4,706,914 A | 11/1987 | Ground | 248/74.3 |
| 4,707,893 A | 11/1987 | Hashizume et al. | 24/446 |
| 4,710,414 A | 12/1987 | Northrup et al. | 428/43 |
| 4,761,318 A | 8/1988 | Ott et al. | 428/85 |
| 4,775,310 A | 10/1988 | Fischer | 425/308 |
| 4,784,890 A | 11/1988 | Black | 428/100 |
| 4,814,036 A | 3/1989 | Hatch | 156/245 |
| 4,819,309 A | 4/1989 | Behymer | 24/576 |
| 4,822,658 A | 4/1989 | Pacione | 428/95 |
| 4,870,725 A | 10/1989 | Dubowik | 24/442 |
| 4,872,243 A | 10/1989 | Fischer | 24/442 |
| 4,875,259 A | 10/1989 | Appeldorn | 24/576 |
| 4,881,997 A | 11/1989 | Hatch | 156/66 |
| 4,894,060 A | 1/1990 | Nestegard | 604/391 |
| 4,897,891 A | 2/1990 | Kallman et al. | 5/493 |
| 4,910,062 A | 3/1990 | Zinke et al. | 428/95 |
| 4,931,343 A | 6/1990 | Becker et al. | 428/95 |
| 4,933,224 A | 6/1990 | Hatch | 428/100 |
| 4,959,265 A | 9/1990 | Wood et al. | 428/343 |
| 4,974,384 A | 12/1990 | Pacione | 52/483 |
| 5,032,122 A | 7/1991 | Noel et al. | 604/391 |
| 5,040,275 A | 8/1991 | Eckhardt et al. | 24/447 |
| 5,042,221 A | 8/1991 | Pacione | 52/749 |
| 5,054,245 A | 10/1991 | Coty | 51/170 |
| 5,056,933 A | 10/1991 | Kamp | 383/63 |
| 5,058,247 A | 10/1991 | Thomas et al. | 24/448 |
| 5,060,443 A | 10/1991 | Pacione | 52/506 |
| 5,066,444 A | 11/1991 | Behr | 264/171 |
| 5,067,210 A | 11/1991 | Kayaki | 24/452 |
| 5,067,822 A | 11/1991 | Wirth et al. | 383/61 |
| 5,077,870 A | 1/1992 | Melbye et al. | 24/452 |
| 5,088,164 A | 2/1992 | Wilson et al. | 24/576 |
| 5,100,400 A | 3/1992 | Mody et al. | 604/391 |
| 5,110,649 A | 5/1992 | Morse et al. | 428/100 |
| 5,116,563 A | 5/1992 | Thomas et al. | 264/167 |
| 5,133,166 A | 7/1992 | Pacione | 52/483 |
| 5,138,750 A | 8/1992 | Gundlach et al. | 24/587 |
| 5,144,786 A | 9/1992 | Pacione | 52/747 |
| 5,149,573 A | 9/1992 | Kobe et al. | 428/93 |
| 5,152,917 A | 10/1992 | Pieper et al. | |
| 5,175,965 A | 1/1993 | Sanborn | 51/293 |
| 5,180,618 A | 1/1993 | Kessler et al. | 428/100 |
| 5,191,692 A | 3/1993 | Pacione | 29/423 |
| 5,196,266 A | 3/1993 | Lu et al. | 428/355 |
| 5,201,101 A | 4/1993 | Rouser et al. | 24/575 |
| 5,201,785 A | 4/1993 | Nagano | 51/358 |
| 5,230,851 A | 7/1993 | Thomas | 264/145 |
| 5,242,646 A | 9/1993 | Torigoe et al. | 264/219 |
| 5,281,244 A | 1/1994 | Wiand | 51/295 |
| 5,309,681 A | 5/1994 | Cheney et al. | 51/170 R |
| 5,315,740 A | 5/1994 | Provost | 24/452 |
| 5,318,741 A | 6/1994 | Thomas | 264/519 |
| 5,339,499 A | 8/1994 | Kennedy et al. | 24/452 |
| 5,374,262 A | 12/1994 | Keuhn, Jr. et al. | 604/391 |
| 5,383,309 A | 1/1995 | Sampietro | 451/533 |
| 5,445,558 A | 8/1995 | Hutchins | 451/344 |

FOREIGN PATENT DOCUMENTS

| | | | |
|---|---|---|---|
| JP | 61-215766 | 9/1986 | D06H/5/00 |
| JP | 61-175357 | 10/1986 | |
| JP | 61-255607 | 11/1986 | A44B/18/00 |
| JP | 63-193655 | 12/1988 | |
| JP | 1-138570 | 9/1989 | |
| JP | 1-166060 | 11/1989 | |
| WO | WO 86/03164 | 6/1986 | B32B/3/06 |
| WO | WO 87/06522 | 5/1987 | B29C/39/36 |
| WO | WO 92/01401 | 2/1992 | A44B/18/00 |
| WO | WO 93/03644 | 3/1993 | A44B/18/00 |

| | Loop Material | Head diameter (mm) | Stem diameter (mm) | Head overhang (mm) | Hooking Stem Density (stems per square cm) | Hooking Stem Overall Height (mm) | Grade: Mode 1 | Grade: Mode 2 | Grade: Mode 3 | Overall Evaluation |
|---|---|---|---|---|---|---|---|---|---|---|
| Example 20 | GNN | 0.36 | 0.20 | 0.16 | 248 | 0.58 | 5 | 5 | 2 | unacceptable |
| Example 21 | KK | 0.36 | 0.20 | 0.16 | 248 | 1.58 | 5 | 2 | 2 | unacceptable |
| Example 22 | W | 0.66 | 0.38 | 0.28 | 35 | 1.0 | 5 | 5 | 5 | above average |
| Example 23 | W | 0.60 | 0.38 | 0.22 | 50 | 1.0 | 5 | 5 | 2 | unacceptable |
| Example 24 | W | 0.56 | 0.38 | 0.18 | 66 | 0.76 | 5 | 5 | 3 | average |

Fig. 5

| | Loop Material | Head diameter (mm) | Stem diameter (mm) | Head overhang (mm) | Hooking Stem Density (stems per square cm) | Hooking Stem Overall Height (mm) | Grade: Mode 1 | Grade: Mode 2 | Grade: Mode 3 | Overall Evaluation |
|---|---|---|---|---|---|---|---|---|---|---|
| Example 1 | GM | 0.762 | 0.508 | 0.127 | 35 | 0.559 | 5 | 5 | 5 | above average |
| Example 2 | GM | 0.762 | 0.508 | 0.127 | 62 | 1.041 | 5 | 5 | 3 | average |
| Example 3 | GM | 0.749 | 0.508 | 0.121 | 62 | 0.902 | 5 | 5 | 5 | above average |
| Example 4 | GM | 0.749 | 0.508 | 0.121 | 62 | 0.927 | 5 | 5 | 5 | above average |
| Example 5 | KA | 0.749 | 0.508 | 0.121 | 62 | 0.927 | 5 | 5 | 5 | above average |
| Example 6 | KK | 0.749 | 0.508 | 0.121 | 62 | 0.927 | 5 | 5 | 2 | unacceptable |
| Example 7 | GM | 0.610 | 0.381 | 0.114 | 97 | 0.584 | 5 | 5 | 4 | above average |
| Example 8 | KA | 0.610 | 0.381 | 0.114 | 97 | 0.584 | 5 | 4 | 2 | unacceptable |
| Example 9 | KK | 0.610 | 0.381 | 0.114 | 97 | 0.584 | 5 | 4 | 2 | unacceptable |
| Example 10 | GM | 0.699 | 0.508 | 0.95 | 62 | 1.448 | 5 | 5 | 2 | unacceptable |
| Example 11 | KA | 0.699 | 0.508 | 0.95 | 62 | 1.448 | 5 | 4 | 2 | unacceptable |
| Example 12 | KK | 0.699 | 0.508 | 0.95 | 62 | 1.448 | 5 | 2 | 2 | unacceptable |
| Example 13 | GM | 0.991 | 0.635 | 0.178 | 62 | 0.927 | 5 | 5 | 5 | above average |
| Example 14 | KA | 0.991 | 0.635 | 0.178 | 62 | 0.927 | 5 | 5 | 2 | unacceptable |
| Example 15 | GM | 0.737 | 0.508 | 0.114 | 35 | 0.546 | 5 | 5 | 3 | average |
| Example 16 | GM | 0.737 | 0.508 | 0.114 | 62 | 0.991 | 5 | 5 | 5 | above average |
| Example 17 | KA | 0.737 | 0.508 | 0.114 | 35 | 0.546 | 5 | 5 | 2 | unacceptable |
| Example 18 | KK | 0.737 | 0.508 | 0.114 | 62 | 0.546 | 5 | 2 | 2 | unacceptable |
| Example 19 | GM | 0.737 | 0.381 | 0.178 | 35 | 0.546 | 5 | 5 | 4 | above average |

ABRASIVE ARTICLE

This is a continuation of application Ser. No. 08/181,192 filed Jan. 13, 1994 now abandoned.

TECHNICAL FIELD

The invention relates to a coated abrasive article, such as an abrasive disc or an abrasive sheet.

BACKGROUND OF THE INVENTION

Abrasive articles are used in a variety of fields for abrading material from a surface of a workpiece. For example, a circular abrasive disc may be releasably mounted on a back-up pad for rotative movement by a random orbital sander. When the disc is rotated, and the exposed abrasive surface of the disc is urged against the workpiece surface, material may be removed from the workpiece. This operation may be desirable for surface refinement purposes, or for the removal of excess material from the workpiece.

Abrasive discs and sheets often have some type of integral attachment system, to enable the disc or sheet to be releasably attached to a back-up pad. Three such abrasive discs that are relevant to the present invention—discs with pressure sensitive adhesive, textile materials, and stalks, respectively—are described seriatim below.

One type of abrasive disc includes an integral layer of pressure sensitive adhesive ("PSA") on the back surface of the disc. The PSA adheres the disc to the back-up pad, and is sufficiently aggressive to prevent displacement of the abrasive article with respect to the back-up pad during use. Furthermore, the PSA permits the abrasive article to be peeled away from the back-up pad relatively easily, such that a new abrasive disc may be applied to the back-up pad with a minimum of time and effort.

Although they have certain benefits, PSA abrasive discs also have some limitations. For example, the PSA can be too aggressive in its adhesion to the back-up pad, such that the operator may be unable to remove all of the abrasive article from the back-up pad. If pieces of the disc backing or areas of PSA, or both, are left on the back-up pad, the resultant buildup can cause high spots on the back-up pad and present an uneven and unbalanced operating surface for receipt of a new abrasive disc. This unevenness may leave undesirable streaks or marks on the surface being abraded. Another potential deficiency of the PSA abrasive disc is that the disc is intended for only a single use, because the PSA layer becomes easily contaminated with dust and debris when it has been detached from the back-up pad. When the PSA layer has been contaminated, reattachment to the back-up pad is difficult or impossible, and a new disc must be provided. This single use characteristic thus can be wasteful, because an abrasive disc may have to be discarded before the abrasive surface has worn out.

Another type of abrasive disc, referred to herein as the "textile" disc, includes a textile loop material on the rear surface of the abrasive article. The textile material can be, for example, woven or non-woven web, brushed nylon, brushed polyester, knitted fabrics, and stitch-bonded fabrics. Textile discs are described in U.S. Pat. No. 4,437,269 (Shaw) and U.S. Pat. No. 4,609,581 (Ott), and an example of a textile abrasive disc is available from the Minnesota Mining and Manufacturing Company of St. Paul, Minn. under the designation Hookit™ discs. Textile discs are typically used in conjunction with a back-up pad having a plurality of engaging members that are bonded to the attachment surface of the back-up pad. The engaging members on the back-up pad are designed to engage the textile material of the textile disc, to secure the abrasive disc to the back-up pad.

Textile abrasive discs overcome some of the disadvantages associated with PSA discs. For example, textile abrasive discs may be removed from and reattached to the back-up pad several times, even if the textile material is exposed to dust or dirt. Thus, textile discs may be used several times before they must be discarded. Also, the textile material does not leave any adhesive residue on the back-up pad.

Textile abrasive discs, however, also exhibit some disadvantages. For example, textile discs can shift relative to the back-up pad during use, especially when the textile is a low weight material. Also, if the textile material is damaged during disengagement from the back-up pad, the disc may be limited to a single use. Furthermore, fibers from the textile material tend to come loose from the abrasive disc, which can clog the engaging members on the back-up pad. The loose fibers may also become airborne, which is undesirable in some environments where, for example, surfaces prepared for painting or freshly painted surfaces are present. Also, when textile abrasive discs are stacked (for handling during packaging, for example) the abrasive grains of one disc can snag the textile material on an. adjacent disc, rendering the abrasive discs difficult to separate. Textile abrasive discs are also typically more expensive to manufacture than PSA discs.

U.S. Pat. No. 4,437,269 (Shaw) relates primarily to textile discs of the type described above, but also briefly discusses a final type of disc referred to herein as the "stalk" disc. Specifically, the '269 patent discloses a back-up pad and a disc, wherein one of the two components has a textile material on one face, and "the other of the pad and the back of the disc ha[s] a layer thereon from which extend loop-engaging or curl-engaging members in the form of monofilament stalks having un-hooked ends." See column 2, lines 55 through 58 of the '269 patent. The stalks project from a backing, and slidingly intermesh with, but do not hook, a loop-like textile material on an opposed surface to attach the two surfaces together.

The abrasive disc of the '269 patent, with one side including stalks having unhooked ends, also may not perform acceptably under some circumstances. For example, it may be desirable for an abrasive disc to exhibit a certain minimum level of peel adhesion force, which may be difficult to attain using a structure such as that shown in the '269 patent.

In view of the disadvantages associated with the various abrasive discs of the prior art, it is desirable to provide an abrasive disc that is relatively inexpensive, reusable, easily and securely attached to a back-up pad, and easily removed from the back-up pad for replacement.

SUMMARY OF THE INVENTION

The present invention includes an abrasive article for releasable affixation to a mating surface having engaging structures. The abrasive article comprises a substrate having first and second major surfaces, abrasive means disposed on the first surface, and a plurality of hooking stems affixed to and projecting from the second surface. The hooking stems each include means for hooking the engaging structures of the mating surface to releasably affix the abrasive article to the mating surface.

In one embodiment, the hooking stems of the abrasive article each have a head attached to the stem, with the head extending radially beyond the periphery of said stem in at least one direction. The heads are adapted for hooking the engaging structures to releasably affix the abrasive article to the mating surface.

In another embodiment, the hooking stems of the abrasive article each have an included distal end angle, as defined herein, of less than approximately 90 degrees. The hooking stems so provided hook the engaging structures to releasably affix the abrasive article to the mating surface.

BRIEF DESCRIPTION OF THE DRAWINGS

The present invention will be further explained with reference to the appended Figures, wherein like structure is referred to by like numerals throughout the several views, and wherein:

FIG. 4 is a sectional view of an abrasive article having hooking stems arranged in a plurality of clusters; and FIGS. 5 and 5(a) are tabular summaries of the results of the Examples.

DETAILED DESCRIPTION OF THE INVENTION

Figure 1:
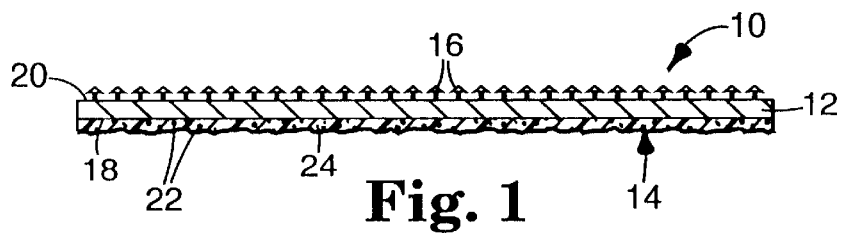
FIG. 1 is a sectional view of an abrasive, article according to the present invention.
Figure 2A:
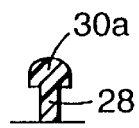
FIGS. 2(a) through 2(n) are sectional views of several embodiments of hooking stems according to the present invention.
Figure 2B:
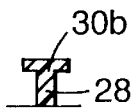
Figure 2C:
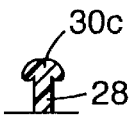
Figure 2D:
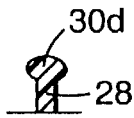
Figure 2E:
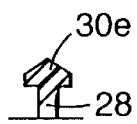
Figure 2F:
Figure 2G:
Figure 2H:
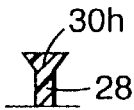
Figure 2I:
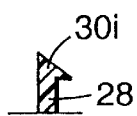
Figure 2J:
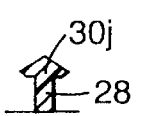
Figure 2K:
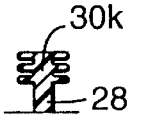
Figure 2L:
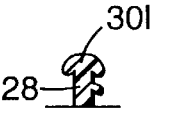
Figure 2M:
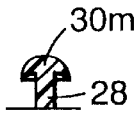
Figure 2N:
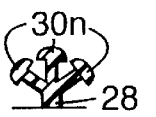
Figure 3A:
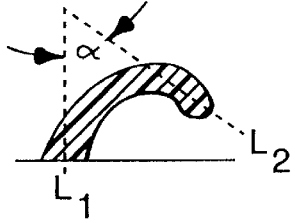
FIGS. 3(a) through 3(d) are sectional views of several additional embodiments of hooking stems according to the present invention.
Figure 3B:
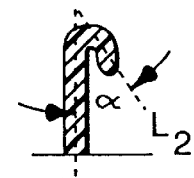
Figure 3C:
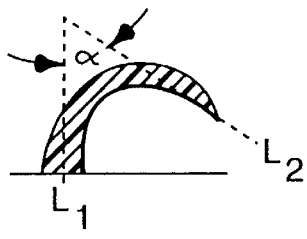
Figure 3D:
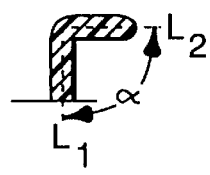

FIG. 1 illustrates a cross-sectional view of an abrasive disc 10 according to the present invention. Although illustrated herein as being circular and flat, the abrasive article of the present invention could have any desired shape, including but not limited to a circle, an oval, a polygon (such as a rectangle, square, or a star), or a multi-lobed shape (such as a daisy). Abrasive disc 10 includes substrate 12, abrasive surface 14, and hooking stems 16, each of which will be described in greater detail below.

Substrate 12 includes first and second major surfaces 18 and 20, respectively. The substrate of the present invention may comprise one or more of several different materials, including but not limited to fabric or cloth, paper, polymeric film, vulcanized fiber, woven or nonwoven webs, and treated versions or combinations thereof. A preferred substrate is a primed polyester film, which is available from Imperial Chemical Industries Americas Inc. of Wilmington, Del. under the designation ICI-475 film.

First major surface 18 of substrate 12 includes means for abrading a surface. In the illustrated embodiment, abrasive means is shown as abrasive particles 22 that are bonded to the first major surface 18 by a bonding material 24. The abrasive particles can include, but are not limited to, garnet, cubic boron nitride, emery, aluminum oxide, silicon carbide, alumina-zirconia, diamond, and ceramic aluminum oxide. Typical bonding materials include animal glue and synthetic resins. Materials such as grinding aids, fillers, dyes, pigments, fibers, lubricants, surfactants, antistatic agents, coupling agents, plasticizers, and suspending agents may also be added to the abrasive means.

Non woven abrasive products incorporating abrasive grains may also be used as abrasive means in conjunction with the present invention. Nonwovens typically comprise an open porous lofty polymer filament structure (substrate) having the abrasive grains distributed throughout the fiber structure and bonded therein by an organic binder. Typical fibrous filaments structures applicable to such constructions comprise polyamides, polyesters, and polypropylene. Nonwoven abrasives are well known in the art—see, for example, U.S. Pat. No. 2,958,593 (Hoover et al.)—and thus will not be described further herein.

Hooking stems 16 are provided on second major surface 20, as shown in FIG. 1. As used herein, a hooking stem means a stem having 1) a free end that is spaced from the surface to which the stem is attached, and 2) a structure that enables the hooking stem to releasably hook structures provided on an opposed surface. Hooking stems 16 may be selected from among numerous different designs, some of which are shown and described herein. It should be understood that other hooking stem designs are comprehended by the present invention, though they are not specifically described below.

Each hooking stem is provided on and projects from the second surface 20. The hooking stems may be directly provided on the second surface 20 by being formed integrally with the second surface 20, or may be provided on an intermediate sheet or layer, which is affixed to the second surface. Stated differently, the individual hooking stems may or may not be directly bonded to the second surface 20. The hooking stems of the present invention may be provided on the second major surface in one of several ways. For example, the hooking stems may be formed from the same material as the substrate 12, such that the hooking stems are unitary with the substrate. Alternatively, the hooking stems may be affixed to the second major surface by, for example, an adhesive such as a hot-melt adhesive. In another embodiment, the hooking stems are formed from a separate sheet member (e.g. a plastic sheet), and the sheet member is affixed to the second major surface of the substrate. The separate sheet member may be bonded to the substrate directly (by ultrasonic bonding, for example), or by means of an adhesive. Other layers, including but not limited to an adhesive layer or a primer layer, may also be interposed between the hooking stems and the substrate.

Stem 28 may have any suitable cross-sectional. shape, taken parallel to the substrate, including but not limited to a circle, an oval, a polygon (such as a star, a cross, a rectangle, or a parallelogram), or a multi-lobed shape (such as a daisy or a clover). The stems may be solid or hollow, as desired, and the cross-sectional area of the stem taken parallel to the second surface 20, in the case of a cylindrical stem, is preferably within the range of about 0.002 to 25 mm$^2$ (0.000004 to 0.04 in$^2$), more preferably between 0.01 and 1.0 mm$^2$ (0.000016 and 0.0016 in$^2$), and most preferably between 0.05 and 0.45 mm$^2$ (0.000078 and 0.0007 in$^2$). The maximum diameter of the cylindrical stem is preferably between approximately 0.05 and 5.0 mm (0.002 and 0.20 in), more preferably between 0.13 and 1.0 mm (0.005 and 0.04 in), and most preferably between 0.25 and 0.76 mm (0.01 and 0.03 in). The overall length of the stem is preferably between approximately 0.01 and 10 mm (0.0004 and 0.40 in), more preferably between 0.05 and 2.6 mm (0.002 and 0.102 in), and most preferably between 0.13 and 1.0 mm (0.005 and 0.04 in). It should be noted that hooking stem shapes, diameters, and lengths can be mixed within a given abrasive article, such that the abrasive article comprises hooking stems of more than one shape, diameter, and/or length. Also, the shape, size, and orientation of the hooking stems may be selected to provide a suitable shear strength and peel strength for a given application.

Hooking stems 16 may be straight or arcuate, and may be arranged in a regular array or be randomly distributed across the second major surface. For example, it may be desirable to provide helical hooking stems, or to arrange the hooking stems in parallel, sinusoidal columns. The hooking stem density can be selected as desired, and preferably is between approximately 8 and 310 hooking stems per square centimeter (50 and 2000 hooking stems per square inch), although other hooking stem densities can be provided.

When the abrasive article is attached to an opposed surface, such as a surface having a plurality of loop members, not all of the hooking stems must engage with the structures (such as a loop) of the opposed surface. Typically, a majority of the hooking stems will hook the structures of the engaging surface, and the disengagement force will typically be directly related to the number of hooking stems that are engaged. The percentage of hooking stems that are engaged by a particular opposed surface depends on many factors, such as hooking stem dimensions and density, and the topography of the opposed surface.

Figures 4, 5A:
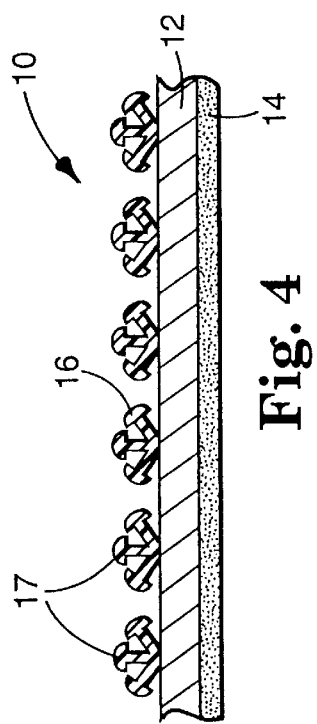

The hooking stems 16 may also be arranged in a plurality of clusters, as shown in FIG. 4 at 17. That is, two or more stems may be placed close to each other in a cluster, with adjacent clusters separated from each other by a distance greater than the distance between the stems within a cluster. The stems within each cluster could be inclined at any suitable orientation, although the stems within each cluster are preferably inclined at different orientations. Furthermore, the clusters could be randomly or uniformly distributed over the surface to which the stems are attached, as suitable to the particular application. Clusters can be provided in a plurality of rows, or stripes, and those rows may be parallel (either straight rows, or curvalinear rows).

The preferred hooking stem material is an organic polymeric material, such as a thermosetting material or a thermoplastic material. Useful materials include, but are not limited to, polyurethanes, polyamides, polyolefins (for example, polyethylene and polypropylene), polyesters, and combinations thereof. The hooking stem may also comprise one or more additives, including but not limited to fillers, fibers, antistatic agents, lubricants, wetting agents, surfactants, pigments, dyes, coupling agents, plasticizers, and suspending agents.

The hooking stems discussed above also include means for hooking an engaging structure on an opposed surface (such as a loop material) to releasably affix the abrasive article to the opposed surface. In one embodiment, the hooking means is shown as at least one head 30 (shown as heads 30*a* through 30*n* in the illustrated embodiments) provided on each stem, as shown in the side views illustrated in FIGS. 2(*a*) through 2(*n*). A head 30 may also, or instead, be provided at other locations along stem 28, as shown in FIGS. 2(*k*) and 2(*l*), for example. A head, as used herein, means any structure that extends radially beyond the periphery of the stem in at least one direction.

Head 30 may have any suitable three-dimensional shape, such as, for example, a hemisphere, a sphere, a cube, a mushroom cap, a cylinder, a cone, a pyramid, a disc, or a barb. Some head designs thought to have utility in the context of the present invention are shown in FIG. 2. It is preferred, although not required, that the head have at least one undercut portion that extends away from the stem at approximately a 90 degree angle, such as the heads shown in FIGS. 2(*a*), 2(*b*), 2(*e*), 2(*f*), 2(*g*), 2(*i*), 2(*j*), and 2(*k*), to hook the engaging members of an opposed mating surface. It is also possible to provide a head having portions that extend toward the base of the stem, creating an "underhang" portion of the head. In other embodiments, each stem is provided with two or more heads, the shape of which may be selected as desired.

The length of head 20 is preferably between approximately 0.05 mm and 2.0 mm (0.002 and 0.079 in), and is more preferably between approximately 0.1 and 1.1 mm (0.004 and 0.045 in), measured from the first point at which the head portion departs from the stem to the point most distant therefrom. These size ranges are for hooking stems that are adapted for interengagement with a durable loop material.

The size of the portion of the head that extends radially beyond the stem can be important for insuring proper engagement and disengagement of the abrasive article and the opposed surface. If the head extends radially beyond the stem for too little a distance, the disengagement force between the abrasive article and the opposed surface may be insufficient. Conversely, if the head extends beyond the stem for too great a distance, the heads may not engage with the opposed surface, or if a sufficient number of heads engage, the disengagement force may be greater than is desired. Thus, it is preferred that the maximum head diameter exceed the stem diameter by at least approximately 0.05 mm (0.002 in), but not by more than approximately 1.5 mm (0.06 in).

The hooking stems are preferably generally perpendicular to the second surface, although the hooking stems may be inclined with respect to the second surface if desired. Also, it may be desirable to provide heads at either a predetermined orientation or at a random orientation relative to each adjacent head, to increase the disengagement force associated with the disc. In addition, for an abrasive article such as a disc to remain firmly attached to a mating surface while in use, it is preferred that if the heads on the hooking stems are provided on only one side of the stem (known as a "directional" hooking stem), then the heads on the hooking stems should not all have the same orientation.

In another embodiment, the hooking means of the present invention comprises hooking stems having an included distal end angle of less than approximately 90 degrees, as shown in FIGS. 3(*a*) through 3(*d*). The included distal end angle, which is illustrated by the symbol a in FIG. 3, is defined as the included angle between a straight line perpendicular to the second major surface at the proximal end of the hooking stem (line $L_1$ in FIG. 3) and a straight line extending through and concentric with the distal end of the hooking stem (line $L_2$ in FIG. 3). When angle $\alpha$ is less than approximately 90 degrees, the distal end of each hooking stem is adapted to hook an engaging structure of an opposed surface, and yet may be released from that structure by an appropriate tensile force. Hooking stems constructed in accordance with this embodiment may also include a head of the type described with reference to FIG. 2, above, but a head is not required due to the specified distal end angle of the hooking stems.

Abrasive articles according to the present invention may be attached to surfaces, such as a back-up pad, having any suitable engaging structures, such as fibers, filaments (such as brushed nylon and brushed polyester), woven and nonwoven fabrics, knitted fabric, and stitch-bonded fabrics. Other applications are also contemplated, such as attachment to foam (particularly open-cell foam) or to a compatible set of engaging hooks.

The article of the present invention may be made in one of many different ways, only some of which are specifically described and illustrated herein. With regard to suitable methods of making the abrasive article of the present invention, reference is made to commonly assigned copending U.S. patent application Ser. No. 08/181,193, entitled "Method of Making an Abrasive Article" filed Jan. 13, 1994, the contents of which is incorporated herein by reference. Several suitable processes are adaptations of known methods for making fastener members, such as the methods described in U.S. Pat. No. 5,058,247 (for low cost hook fasteners) and U.S. Pat. No. 4,894,060 (for diaper fasteners), and in U.S. patent application Ser. No. 08/048,874, entitled "Mushroom-Type Hook Strip for a Mechanical Fastener," filed Apr. 18, 1992, which is commonly assigned to the assignee of the present invention.

This application discloses a mushroom-type hook strip comprising a homogeneous backing of thermoplastic resin and, integral with backing, an array of upstanding stems distributed across at least one face of the backing. A method of making the mushroom-type hook strip employs a mold which can be cylindrical and has cavities recessed from a continuous surface that are the negatives of an array of upstanding stems. The novel method involves the steps of:

a) moving the surface of the mold along a predetermined path, b) continuously injecting a molten, molecularly orientable thermoplastic resin into the cavities in excess of the amount that would fill the cavities, which excess forms a layer of resin overlying the cavities and the surface around the cavities, c) continuously cooling the mold around the cavities to cause the molten resin to become molecularly oriented while it fills the cavities, d) allowing the injected resin to solidify, e) continuously stripping from the mold the solidified resin layer as a backing and integral array of upstanding stems, and f) deforming the tips of the stems by contact with a heated surface to produce a circular disc shaped mushroom head at the tip of each stem.

In the various methods described below, the hooking stems are typically formed by molding a flowable material. The flowable material can be any suitable material, such as a polymer, a metal, or a ceramic precursor. It is also within the scope of this invention to use two or more different flowable materials to make the hooking stems. For instance, one flowable material may be used to form the head and a second flowable material may be used to form the stem.

The preferred flowable material is a polymeric material, such as a thermoplastic material or a thermosetting material. Suitable materials include a thermoplastic polyurethane, polyvinyl chloride, polyamides, polyimides, polyolefins (e.g. polyethylene and polypropylene), polyesters (e.g. polyethylene terephthalate), polystyrene, nylons, acetal, block polymer (e.g. polystyrene materials with elastomeric segments, available from Shell Chemical Company of Houston, Tex. under the designation Kraton™), polycarbonate, thermoplastic elastomers, and copolymers and blends thereof. Specific examples of materials that are believed to have utility in the context of the present invention include a polypropylene random copolymer available from the Shell Chemical Company of Houston, Tex. under the designation SRD6-321, a polypropylene random copolymer available from the Shell Chemical Company of Houston, Tex. under the designation SRD7-463, a polyester hot-melt adhesive available from the Bostik Company of Middleton, Mass. under the designation 7199, and a polyamide hot-melt adhesive available from the Henkel Company of Kankakee, Ill. under the designation Macromelt 6300. The flowable material may also contain additives such as fillers, fibers, antistatic agents, lubricants, wetting agents, surfactants, pigments, dyes, coupling agents, plasticizers, suspending agents, and the like.

In each of the methods described below, abrasive means—typically in the form of abrasive particles—is disposed on a surface of an abrasive sheet. The application of abrasive particles to a surface is known in the art, and will be described only briefly herein. One method of providing an abrasive on a sheet to form an abrasive sheet involves coating an abrasive slurry, comprising abrasive particles dispersed in a resin, onto the sheet. The abrasive slurry can be applied by any conventional technique such as roll coating, die coating, spraying, knife coating, and the like. After coating the abrasive slurry, the resulting article is exposed to conditions (e.g. heat, radiation, or the passage of time) sufficient to cure the resin and form a cured binder. This results in the abrasive slurry being converted into an abrasive composite that is bonded to the abrasive sheet.

In a second method of applying an abrasive to an abrasive sheet, a make coat resin is coated by any conventional technique onto a sheet member. A plurality of abrasive particles is then applied into the make coat resin and the make coat resin is at least partially cured. Next, a size coat resin is applied over the abrasive particles and make coat. Finally the size resin and make coat resin are cured to form make and size coat binders. In a variation of this method, the make coat-resin may be partially cured prior to the application of the abrasive particles.

Four illustrative methods of making an abrasive article according to the present invention will be described particularly herein, and those methods are referred to for simplicity as "Lamination," "Direct Formation," "Extrusion," and "Unitary Construction." It should be borne in mind that variations on these methods, as well as other methods, are also contemplated by the present invention.

Lamination

Generally, the Lamination manufacturing process of the present invention involves molding hooking stems and a base sheet from which the hooking stems project, and laminating the base sheet to an abrasive sheet to form the abrasive article of the present invention. The hooking means may either be provided in-mold (molding one or more heads on each stem, or molding hooking stems having an included distal end angle of less than approximately 90 degrees, for example), or may be provided by a post-forming process (heating unheaded stems to provide a head, or heating a straight stem to provide an included distal end angle of less than approximately 90 degrees, for example).

The molding step of the Lamination method may include any suitable molding apparatus, as known in the molding art. For example, the hooking stems and base sheet could be injection molded, molded by compressing a heated sheet member against a molding surface, or molded by flowing a flowable material over and into the cavities of a mold, which may be stationary or moving (e.g. a belt, a tape, or a drum). The mold can be made from suitable materials that are rigid or flexible. The mold components can be made of metal, steel, ceramic, polymeric materials (including both thermosetting and thermoplastic polymers) or combinations thereof. The materials forming the mold must have sufficient integrity and durability to withstand the thermal energy associated with the particular molten metal or thermoplastic material used to form the base sheet and hooking stems.

The cavities of the mold are each adapted to form a hooking stem of a suitable configuration (either with, or without hooking means, as desired), and can be formed in the mold by any conventional technique such as die punching, drilling, laser drilling, machining, casting, etching, diamond turning and the like. The placement of the cavities determines the spacing and orientation of the hooking stems on the base sheet, and thus on the abrasive article.

The flowable material is flowed into the mold cavities, and over the surface of the mold to form the base sheet. To facilitate flowage of the material, the material typically must be heated to an appropriate temperature, and then coated into the cavities. This coating technique can be any conventional technique, such as calendar coating, cast coating, curtain coating, die coating, extrusion, gravure coating, knife coating, spray coating, and the like.

After the thermoplastic material has been coated into the mold cavities and over the mold surface, the material is cooled to solidify and form the hooking stem. The flowable material is solidified in and on the mold to form the hooking stems and base sheet, which are then separated from the mold. The flowable material will often shrink when it is solidified, which facilitates release of the hooking stems and base sheet from the mold. Part or all of the mold may be cooled to aid in solidifying the hooking stems and base sheet. Cooling can be effected by the use of water, forced air, liquid nitrogen, or other cooling processes.

When thermosetting resins are used as the flowable material, the resin is applied to the mold as a liquid in an uncured or unpolymerized state. After the resin has been coated onto the mold, it is polymerized or cured until the resin is solid. Generally the polymerization process involves either a setting time, or exposure to an energy source, or both to facilitate the polymerization. The energy source, if provided, can be heat or radiation energy such as electron beam, ultraviolet light or visible light. After the resin is solidified it is removed from the mold. In some instances, it may be desired to further polymerize or cure the thermosetting resin after the hooking stem is removed from the tool. Examples of suitable thermosetting resins include melamine formaldehyde resins, acrylate resins, epoxy resins, urethane resins, and the like.

As noted previously, hooking means may be provided by post-forming straight stems that project from the base sheet. Post-forming is believed to be especially useful with thermoplastic materials. One useful post-forming technique involves the application of heat (by, for example, a hot air stream, radiative heating, flash photolysis, or by conductive heating due to contact between the hooking stems and a heated surface) to produce a head on the stem, or to produce a hooking stem having an included distal end angle of less than approximately 90 degrees. For example, a base sheet having a plurality of straight, projecting stems may be passed through a nip, with the nip roll that contacts the distal ends of the stems being heated, and the opposed nip roll being chilled, to produce localized heating and compression of the distal end. When SRD7-463 polypropylene resin is used, a hot nip roll temperature of between 143° to 154° C. (290° to 310° F.), and nip pressure of greater than 0.552 MPa (80 psi) has been shown to have utility. The heated nip roll typically forms a "nail head" type hooking stem of the type shown in FIG. 2(b).

After the base sheet (including hooking stems) has been formed, it is laminated to the back side of an abrasive sheet by a suitable laminating process. If the base sheet is made of a thermoplastic, the base sheet may be heated to adhere the base sheet to the abrasive sheet, such that the thermoplastic material will serve as the laminating adhesive. Alternatively, a laminating adhesive can be coated on the back side of the abrasive sheet, the back side of the base sheet, or both, to bond the respective sheets together to form the abrasive article. The laminating adhesive can be a thermoplastic or thermosetting material as described above, or a pressure sensitive adhesive. The laminating step may include applying pressure to the abrasive article laminate, to facilitate bonding of the various components.

Direct Formation

In the Direct Formation method, hooking stems are directly formed on the back of an abrasive sheet member to provide the abrasive article of the present invention. As with the method described above, hooking stems may be directly formed on an abrasive sheet either with or without hooking means, whereby in the latter case hooking means may be provided by a post-forming process.

In the Direct Formation method, a flowable material is coated into cavities of a mold, preferably a rotogravure roll, and then deposited on a receiving surface, preferably an abrasive sheet in roll form. The flowable material is preferably a thermoplastic material, but other materials, including those listed above with reference to the Lamination method, are also contemplated. When the flowable material is deposited, or printed, on the abrasive sheet, the flowable material is drawn out from the cavities of the gravure roll and bonds to the abrasive sheet. Because the flowable material is suspended in a thread-like state between the abrasive sheet and the cavities of the mold, the flowable material must be cut using a suitable severing means, preferably an electrically heated wire. Under suitable conditions, the severed thread then wilts to form a hooking stem. The structural features of the hooking stem may be altered by directing a flow of air against the hooking stems in one or more directions. If air is directed against the hooking stems in different directions, the hooking stems may tend to become randomly oriented, which is desirable for increasing the disengagement force between the abrasive article and an opposed surface.

In another aspect of this method, the hooking stems could be directly formed on a base sheet (by rotogravure roll application), such as a polymeric film or paper, which base sheet could then be laminated to the abrasive sheet as described with reference to the Lamination method above. This method is, in effect, a hybrid of the Lamination method and the Direct Formation method.

In another aspect of the Direct Formation method, an additional bonding adhesive material may be applied to either the back side of the backing or to the outer surface of the mold, or to both. The bonding. adhesive, which can be a thermoplastic or thermosetting material as described above, bonds the hooking stems to the abrasive article backing.

Extrusion

The extrusion method is similar to the method disclosed in U.S. Pat. No. 4,894,060 (Nestegard), the contents of which is hereby incorporated herein by reference. A flowable material is extruded through a die to form a base sheet with spaced rail members projecting from the base sheet. The cross-sectional shape of the rail members, taken perpendicular to the base sheet, is that of the hooking stem to be formed. The rail members are cut transversely at spaced locations along the length of the rail members, and the base sheet is stretched to space apart the discrete hooking stems provided thereby. The base sheet and hooking stems made according to this method may then be laminated onto an abrasive sheet in accordance with the Lamination method described above.

Unitary Construction

A unitary construction denotes an abrasive article wherein the base sheet having projecting hooking stems is also the abrasive sheet having abrasive means on the opposite surface. Stated differently, a single sheet member has hooking stems projecting from one face thereof, and abrasive means on the opposite face thereof. The sheet member should be made from a material that has sufficient strength, integrity and heat resistance to withstand the conditions associated with the manufacture and intended application of the abrasive article.

An abrasive article of unitary construction can be made by any of the foregoing techniques. A key to such a construction is the provision of a flat surface on the surface opposite the hooking stems. The flat surface enables an abrasive medium, such as mineral particles, to be embedded in or bonded to the flat surface to provide the abrasive article.

It is also within the scope of the present invention to mold the substrate and hooking stems simultaneously. The materials used to make the substrate and the hooking stems may be the same or different, and in one embodiment, the material used to make the substrate is more rigid than the material used to make the hooking stems.

In another aspect of the invention, printed indicia may be provided on a surface of the abrasive article, such that the printed indicia is visible through either or both of the hooking stems or the abrasive material.

The present invention will be further explained with reference to the following Examples.

EXAMPLES

Abrasive discs were prepared as described below with reference to each of the particular Examples. These discs were then tested using the following test procedure, for purposes of comparing the performance of different discs. These Examples are provided only for purposes of illustration.

Test Procedure

The abrasive discs of the present invention were tested using a three mode abrasive attachment test. This test subjected each abrasive disc to certain conditions (described below) that were intended to simulate an actual abrading process, and the condition of the abrasive disc was then assessed at the conclusion of each mode of the test. The test procedure was as follows:

Step 1) The abrasive disc was attached to the back-up pad of a dual action air sander of the type available from National-Detroit Inc., of Rockford, Ill., under the designation DAQ, using two firm pats by the operator's hand. The abrasive disc was then removed from the back-up pad and replaced on the back-up pad, again using two firm pats by the operator's hand. The placement, removal, and replacement steps were intended to simulate repetitive use of the abrasive disc, and to simulate repositioning a disc that had been mispositioned.

Step 2) The abrasive disc was rotated by the pneumatic dual action sander, wherein the dynamic air pressure at the tool (the air pressure with the back-up pad allowed to rotate freely) was approximately 42 newtons per square centimeter (60 pounds per square inch). The abrasive face of the rotating abrasive disc was contacted to a flat, 14 gauge steel panel, at approximately a 5 degree angle between the panel and the plane of the abrasive disc. This was designated Mode 1, and the sanding continued at a force of approximately 110 N (25 lbs) for a period of approximately 15 seconds. The sanding action was from side-to-side for a total of 7.5 seconds (at approximately 1 second per sweep), and toward and away from the operator for a total of 7.5 seconds (at approximately 1 second per sweep).

Step 3) Following Step 2), the abrasive face of the abrasive disc was examined for evidence that the disc had puckered, creased, or wrinkled, and a grade was assigned to the condition of the abrasive disc based on the following criteria.

Grade 5: Superior, with no significant puckering (separation of the disc from the backup pad) or wrinkling (creases in the disc). The abrasive disc stayed firmly attached to the back-up pad during the test.

Grade 4: Slight wrinkling of the abrasive disc, with either the center or the edge of the disc noticeably separated from the back-up pad.

Grade 3: Noticeable puckering (up to 25% of the disc separated from the back-up pad) or wrinkling (one or two creases with lengths less than 25% of the diameter of the disc).

Grade 2: Severe wrinkling and puckering of the abrasive disc; less than 50% of the disc in contact with the back-up pad.

Grade 1: Unacceptable; the abrasive disc detached from the back-up pad during the test.

Step 4) The abrasive disc was detached from the back-up pad of the dual action air sander, and then Step 1) was repeated.

Step 5) Repeat Step 2), except that the angle between the panel and the plane of the abrasive disc was 10 degrees.

Step 6) Repeat Step 3).

Step 7) Repeat Step 4).

Step 8) Repeat Step 2), except that the angle between the panel and the plane of the abrasive disc was 45 degrees.

Step 9) Repeat Step 3).

Any rating of 1 or 2 during any of the 3 modes signifies that the abrasive article is unacceptable for normal use because the attachment system could not adequately withstand the test conditions, which were intended to simulate actual abrading applications. A rating of 3 or 4 during one of the 3 modes indicates that the abrasive article may be acceptable for some applications, but may be unacceptable for other applications where wrinkling of the abrasive article is not tolerable. Thus, an acceptable abrasive article typically should be rated a 5 in at least two of the three test modes.

Each of the Examples relates to a particular type of abrasive article that was subjected to the foregoing three mode test. The exemplary abrasive articles each had the following features in common. An abrasive disc was provided of the type available from the Minnesota Mining and Manufacturing Company of St. Paul, Minn., under the designation 3M 255L Grade P180 Stikit™ Gold Film. The abrasive disc included a layer of polyacrylate pressure sensitive adhesive on the rear face thereof, to which a backing layer having hooking stems was adhered. The hooking stems were of the "nail head" design generally shown in FIG. 2(b), the dimensions of the hooking stems are tabulated in FIGS. 5 and 5(a).

The abrasive sheet member with hooking stems was attached to a back-up pad having a loop material adhered thereto, in the manner described in the foregoing test procedure. The type of loop material used in each of the Examples is listed in FIGS. 5 and 5(a). The abbreviation "GM" in FIGS. 5 and 5(a) denotes that the loop material was knitted nylon fiber (nylon 6; 200 denier/10 filaments) of the type available from Guilford Mills, of Greensboro, N.C., under the designation 19073. The abbreviation "GNN" denotes that the loop material was a napped nylon fiber (40 denier; 12 filaments) of the type available from Guilford Mills, of Greensboro, N.C., under the designation 18904. The abbreviation "KA" denotes that the loop material was a knitted nylon fiber (210 denier; 12 filaments) of the type available from Kanebo Belltouch Ltd., of Osaka, Japan, under the designation 2A3. The abbreviation "KK" denotes that the loop material was a knitted nylon fiber (210 denier; 12 filaments) of the type available from Kanebo Belltouch Ltd., of Osaka, Japan, under the designation 2K3. The abbreviation "W" denotes that the loop material was a nylon fiber (48 denier; 12 filaments) of the type available from Woodeaves, Ltd., of Lancaster, England, under the designation 1909.

The various Examples compare abrasive articles having different characteristics, such as head diameter, stem diameter, head overhang, hook density, hooking stem height, and loop material, As shown in FIGS. 5 and 5(a). The overall performance was evaluated based on the grades assigned during each testing mode, and the evaluation is provided in the far right hand column of FIGS. 5 and 5(a). The Examples demonstrate that certain embodiments of the inventive abrasive article exhibit average or above average performance, and would likely be suitable for use in sanding applications.

The benefits of the inventive abrasive disc are manifold. For example, the abrasive disc of the invention exhibits a decreased tendency to foul due to loose fibers. Also, because no pressure sensitive adhesive is used to attach the abrasive disc to the back-up pad, the risk of fouling the workpiece surface is markedly reduced. Furthermore, the abrasive disc of the invention is adapted for repeated engagement and disengagement from the back-up pad, which results in extended product life compared to lightweight textile discs of the prior art. The abrasive disc of the present invention is less likely to be displaced relative to the opposed surface, such as a back-up pad, during use, and the abrasive article may be more easily removed than conventional PSA discs or textile discs.

The present invention has now been described with reference to several embodiments thereof. It will be apparent to those skilled in the art that many changes can be made in the embodiments described without departing from the scope of the invention. For example, a layer of adhesive may be applied in the area surrounding the base of the stems, to further facilitate engagement of the abrasive article to an opposed surface. Thus, the scope of the present invention should not be limited to the structures described herein, but rather by the structures described by the language of the claims, and the equivalents of those structures.

What is claimed is:

1. An abrasive article for releasable affixation to an opposed surface having engaging structures, comprising:
    a) a substrate having first and second major surfaces;
    b) abrasive means disposed on said first surface; and
    c) a base sheet bonded to said second major surface of said substrate, said base sheet including a plurality of hooking stems molded integrally with and projecting from said base sheet, wherein said base sheet and said hooking stems are molded from the same material, said hooking stems each including a head formed on each hooking stem for hooking the engaging structures to releasably affix the abrasive article to the opposed surface.

2. The abrasive article of claim 1, wherein the cross-sectional area of said hooking stem taken parallel to said substrate decreases from the end of said hooking stem closest to said substrate to the end of said stem furthest from said substrate.

3. The abrasive article of claim 1, wherein the cross-sectional area of said hooking stem taken parallel to said substrate is constant along the length of said hooking stem.

4. The abrasive article of claim 1, wherein the angle between a central axis of said hooking stem and said second surface is less than 90 degrees.

5. The abrasive article of claim 1, wherein said hooking stem has a length of between approximately 0.05 to 2.6 millimeters.

6. The abrasive article of claim 4, wherein said hooking stem has a length of between approximately 0.05 to 2.6 millimeters.

7. The abrasive article of claim 1, wherein at least a portion of said hooking stem is made from an organic polymeric material.

8. The abrasive article of claim 7, wherein said organic polymeric material is a thermoplastic material.

9. The abrasive article of claim 7, wherein said organic polymeric material is a thermosetting material.

10. The abrasive article of claim 7, wherein said polymeric material further comprises an additive selected from the group consisting of fillers, fibers, antistatic agents, lubricants, wetting agents, surfactants, pigments, dyes, coupling agents, plasticizers, and suspending agents.

11. The abrasive article of claim 8, wherein said thermoplastic material is selected from the group consisting of polyurethanes, polyamides, polyolefins, polyesters, and combinations thereof.

12. The abrasive article of claim 8, wherein said thermoplastic material is a polyolefin selected from the group consisting of polyethylene and polypropylene.

13. The abrasive article of claim 1, wherein said hooking stems each have a cross-sectional shape, taken generally parallel to said substrate, that is selected from the group consisting of a circle, an oval, a polygon, and a multi-lobed shape.

14. The abrasive article of claim 13, wherein said hooking stems are solid.

15. The abrasive article of claim 1, wherein said heads each have a length of between approximately 0.05 to 1.1 millimeters.

16. The abrasive article of claim 15, wherein said heads each have a length of between approximately 0.1 to 0.5 millimeters.

17. The abrasive article of claim 1, wherein said stem has a generally circular cross section and a stem diameter and said head has a generally circular outer periphery having a diameter at least 0.05 millimeters greater than said stem diameter.

18. The abrasive article of claim 1, wherein the cross-sectional area of each head, taken generally parallel to said substrate and beginning at the distal end of each stem, initially increases and subsequently decreases.

19. The abrasive article of claim 1, wherein the cross-sectional area of each head, taken generally parallel to said substrate, is constant.

20. The abrasive article of claim 1, wherein the cross-sectional area of each head, taken generally parallel to said substrate and beginning at the distal end of each stem, progressively decreases.

21. The abrasive article of claim 1, wherein the cross-sectional area of each head, taken generally parallel to said substrate and beginning at the distal end of each stem, progressively increases.

22. The abrasive article of claim 1, wherein said abrasive article includes been approximately 8 approximately 310 hooking stems per square centimeter.

23. The abrasive article of claim 1, wherein said head is centered symmetrically on said stem.

24. The abrasive article of claim 1, wherein said head is not centered on said stem.

25. The abrasive article of claim 24, wherein the positions of said heads with respect to said respective hooking stems are random.

26. The abrasive article of claim 24, wherein the positions of said heads with respect to said respective hooking stems are predetermined.

27. The abrasive article of claim 1, wherein said heads each have a cross-sectional shape, taken generally parallel to said substrate, that is selected from the group consisting of a circle, an oval, a polygon, and a multi-lobed shape.

28. The abrasive article of claim 1, wherein said hooking stems are arranged in a uniform array on said second surface of said substrate.

29. The abrasive article of claim 1, wherein the abrasive article is a circular disc.

30. The abrasive article of claim 1, wherein the abrasive article has a shape selected from the group consisting of a polygon and a multi-lobed shape.

31. The abrasive article of claim 1, wherein said base sheet is laminated to said second surface of said substrate with a laminating adhesive.

32. The abrasive article of claim 1, wherein said base sheet is molded from a thermoplastic polymer.

33. The abrasive article of claim 1, wherein said plurality of hooking stems are provided on said second surface in a plurality of clusters, wherein each cluster comprises at least two hooking stems, and each cluster is separated from each adjacent cluster by a distance greater than the distance between said hooking stems within a cluster.

34. The abrasive article of claim 1, wherein said head has an outer periphery extending radially beyond the outer periphery of said stem in all directions.

35. An abrasive article for releasable affixation to a surface having engaging structures, comprising:
 a) a substrate having first and second major surfaces;
 b) abrasive means disposed on said first surface, wherein said abrasive means comprises a plurality of abrasive particles bonded to said first major surface of said substrate by a bonding material; and
 c) a plurality of hooking stems provided on and projecting from said second surface, wherein said hooking stems and said substrate are integrally molded from the same material, said hooking stems each having a head attached to said stem and extending radially beyond the periphery of said stem in at least one direction, said heads adapted for hooking the engaging structures to releasably affix the abrasive article to the surface.

36. The abrasive article of claim 35, wherein the cross-sectional area of said stem taken parallel to said substrate decreases from the end of said stem closest to said substrate to the end of said stem furthest from said substrate.

37. The abrasive article of claim 35, wherein the cross-sectional area of said stem taken parallel to said substrate is constant along the length of said stem.

38. The abrasive article of claim 35, wherein the angle between a central axis of said hooking stem and said second surface is less than 90 degrees.

39. The abrasive article of claim 35, wherein the angle between a central axis of said hooking stem and said second surface is approximately 90 degrees.

40. The abrasive article of claim 35, wherein said hooking stem has a length of between approximately 0.05 to 2.6 millimeters.

41. The abrasive article of claim 40, wherein said hooking stem has a length of between approximately 0.13 to 1.0 millimeters.

42. The abrasive article of claim 35, wherein at least a portion of said hooking stems is made from an organic polymeric material.

43. The abrasive article of claim 42, wherein said organic polymeric material is a thermoplastic material.

44. The abrasive article of claim 42, wherein said organic polymeric material is a thermosetting material.

45. The abrasive article of claim 42, wherein said polymeric material further comprises an additive selected from the group consisting of fillers, fibers, antistatic agents, lubricants, wetting agents, surfactants, pigments, dyes, coupling agents, plasticizers, and suspending agents.

46. The abrasive article of claim 43, wherein said thermoplastic material is selected from the group consisting of polyurethanes, polyamides, polyolefins, polyesters, and combinations thereof.

47. The abrasive article of claim 43, wherein said thermoplastic material is a polyolefin selected from the group consisting of polyethylene and polypropylene.

48. The abrasive article of claim 35, wherein said stems each have a cross-sectional shape, taken generally parallel to said substrate, that is selected from the group consisting of a circle, an oval, a polygon, and a multi-lobed shape.

49. The abrasive article of claim 35, wherein said stems are solid.

50. The abrasive article of claim 35, wherein said heads each have a length of between approximately 0.05 to 1.1 millimeters.

51. The abrasive article of claim 50, wherein said heads each have a length of between approximately 0.1 to 0.5 millimeters.

52. The abrasive article of claim 35, wherein said stem has a generally circular cross section and a stem diameter and said head has a generally circular outer periphery having a diameter at least 0.05 millimeters greater than said stem diameter.

53. The abrasive article of claim 35, wherein the cross-sectional area of each head, taken generally parallel to said substrate and beginning at the distal end of each stem, initially increases and subsequently decreases.

54. The abrasive article of claim 35, wherein the cross-sectional area of each head, taken generally parallel to said substrate, is constant.

55. The abrasive article of claim 35, wherein the cross-sectional area of each head, taken generally parallel to said substrate and beginning at the distal end of each stem, progressively decreases.

56. The abrasive article of claim 35, wherein the cross-sectional area of each head, taken generally parallel to said substrate and beginning at the distal end of each stem, progressively increases.

57. The abrasive article of claim 35, wherein said abrasive article includes between approximately 8 to approximately 310 hooking stems per square centimeter.

58. The abrasive article of claim 35, wherein said head is centered symmetrically on said stem.

59. The abrasive article of claim 35, wherein said head is not centered on said stem.

60. The abrasive article of claim 59, wherein the positions of said heads with respect to said respective hooking stems are random.

61. The abrasive article of claim 59, wherein the positions of said heads with respect to said respective hooking stems are predetermined.

62. The abrasive article of claim 35, wherein said heads each have a cross-sectional shape, taken generally parallel to said substrate, that is selected from the group consisting of a circle, an oval, a polygon, and a multi-lobed shape.

63. The abrasive article of claim 35, wherein said hooking stems are arranged in a uniform array on said second surface of said substrate.

64. The abrasive article of claim 35, wherein said abrasive article is a circular disc.

65. The abrasive article of claim 35, wherein the abrasive article has a shape selected from the group consisting of a polygon and a multi-lobed shape.

66. The abrasive article of claim 35, wherein said substrate and hooking stems are molded from a thermoplastic polymer.

67. The abrasive article of claim 35, wherein said plurality of hooking stems are provided on said second surface in a plurality of clusters, wherein each cluster comprises at least two hooking stems, and each cluster is separated from each adjacent cluster by a distance greater than the distance between said hooking stems within a cluster.

68. The abrasive article of claim 35, wherein said head has an outer periphery extending radially beyond the outer periphery of said stem in all directions.

69. An abrasive article for releasable affixation to a surface having engaging structures, comprising:
 a) a substrate having first and second major surfaces;
 b) abrasive means disposed on said first surface, wherein said abrasive means comprises a synthetic resin on said first major surface of said substrate and a plurality of abrasive particles bonded to said substrate by said resin; and
 c) a plurality of hooking stems molded integrally with and projecting from said second surface of said substrate, said hooking stems each having a head attached to said stem and extending radially beyond the periphery of said stem in at least one direction, said heads adapted for hooking the engaging structures to releasably affix the abrasive article to the surface, wherein said substrate and said hooking stems are molded from the same material.

70. An abrasive article for releasable affixation to a surface having engaging structures, comprising:
 a) a substrate having first and second major surfaces;
 b) abrasive means disposed on said first surface, wherein said abrasive means comprises a synthetic resin on said first major surface of said substrate and a plurality of abrasive particles bonded to said substrate by said resin; and
 c) a plurality of hooking stems molded integrally with and projecting from said second surface of said substrate, said hooking stems each having a head attached to said stem, wherein said stem has a generally circular cross section and a stem diameter and said head has a generally circular outer periphery having a diameter at least 0.05 millimeters greater than said stem diameter, said heads adapted for hooking the engaging structures to releasably affix the abrasive article to the surface, and wherein said substrate and said hooking stems are molded from the same material.

71. An abrasive article for releasable affixation to a surface having engaging structures, comprising:
 a) a substrate having first and second major surfaces;
 b) abrasive means disposed on said first surface, wherein said abrasive means comprises a plurality of abrasive particles embedded in said first surface of said substrate; and
 c) a plurality of hooking stems molded integrally with and projecting from said second surface of said substrate, said hooking stems each having a head attached to said stem and extending radially beyond the periphery of said stem in at least one direction, said heads adapted for hooking the engaging structures to releasably affix the abrasive article to the surface, wherein said substrate and said hooking stems are molded from the same material.

72. An abrasive article for releasable affixation to a surface having engaging structures, comprising:
 a) a substrate having first and second major surfaces;
 b) abrasive means disposed on said first surface, wherein said abrasive means comprises a plurality of abrasive particles embedded in said first surface of said substrate; and
 c) a plurality of hooking stems molded integrally with and projecting from said second surface of said substrate, said hooking stems each having a head attached to said stem, wherein said stem has a generally circular cross section and a stem diameter and said head has a generally circular outer periphery having a diameter at least 0.05 millimeters greater than said stem diameter, said heads adapted for hooking the engaging structures to releasably affix the abrasive article to the surface, and wherein said substrate and said hooking stems are molded from the same material.

* * * * *

UNITED STATES PATENT AND TRADEMARK OFFICE
CERTIFICATE OF CORRECTION

PATENT NO.   : 6,579,161 B1
DATED        : June 17, 2003
INVENTOR(S)  : Chesley, Jason A.

It is certified that error appears in the above-identified patent and that said Letters Patent is hereby corrected as shown below:

Column 2,
Line 25, delete "an. adjacent" and insert -- an adjacent -- therefor.

Column 3,
Line 63, delete "Non woven" and insert -- Nonwoven -- therefor.

Column 10,
Line 46, delete "bonding. adhesive," and insert-- bonding adhesive, -- therefor.

Signed and Sealed this

Thirty-first Day of May, 2005

JON W. DUDAS
*Director of the United States Patent and Trademark Office*